United States Patent [19]

Bush et al.

[11] 3,787,640

[45] Jan. 22, 1974

[54] KEY TELEPHONE INTERCOM CIRCUIT

[75] Inventors: Stanley Edward Bush; Kenneth Joseph Roberge, both of Boulder, Colo.

[73] Assignee: Bell Telephone Laboratories, Incorporated, Murray Hill, N.J.

[22] Filed: Dec. 26, 1972

[21] Appl. No.: 318,188

[52] U.S. Cl. .................................................. 179/99
[51] Int. Cl. ............................................ H04m 1/00
[58] Field of Search ................................ 179/99, 81

[56] References Cited

UNITED STATES PATENTS 3,171,901 3/1965 Clemency et al. .................... 179/81
3,427,407 2/1969 Heck et al. .......................... 179/99

*Primary Examiner*—Kathleen H. Claffy
*Assistant Examiner*—Mitchell Saffian
*Attorney, Agent, or Firm*—W. L. Keefauver et al.

[57] ABSTRACT

A key telephone arrangement for controlling intercom and speakerphone connections over an intercom line, wherein a single nonlocking key is utilized for establishing, signalling, and releasing the intercom connections, as well as for activating and deactivating the speakerphone.

10 Claims, 1 Drawing Figure

PATENTED JAN 22 1974 3,787,640
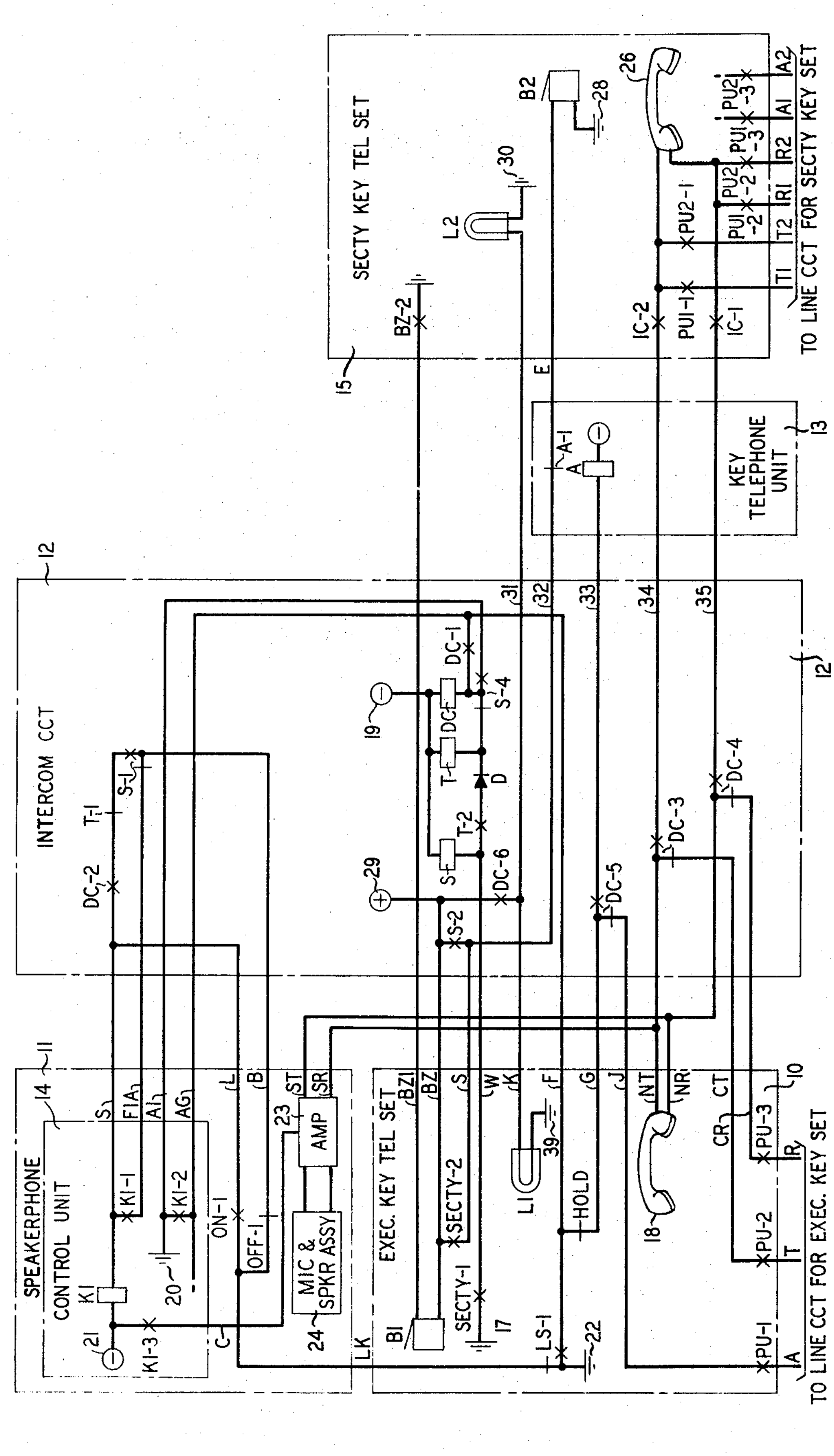

KEY TELEPHONE INTERCOM CIRCUIT

BACKGROUND OF THE INVENTION

This invention relates to key telephone systems and more particularly to an improved key actuated intercom circuit for key telephone systems.

An executive key telephone set is typically equipped with a private secretarial intercom line and, in addition, may also be equipped with a speakerphone which gives a busy executive hands-free telephone set operation. An executive having such a key telephone set arrangement generally uses the speakerphone to converse with his secretary over the intercom line many times during the course of a business day. Presently, a time consuming, sequentially ordered, multi-key operation is required to establish, signal and release an intercom connection when used with the speakerphone. For example, an ON button on the speakerphone must be operated, next the intercom line key must be depressed, and then a signalling button must be operated to alert the secretary to pick up the intercom line. If it is desired to continue the call in privacy over the station handset, rather than over the speakerphone, an OFF button on the speakerphone must be operated. To terminate a speakerphone intercom call, the speakerphone OFF button must be operated to disable the equipment and a line key is operated to reconnect the station to a telephone line.

Accordingly, it is an object of our invention to eliminate the necessity for redundant key operations to establish, signal, and to release speakerphone intercom calls.

SUMMARY OF THE INVENTION

The foregoing and other objects are achieved in accordance with our control arrangement which permits a station user to establish and signal a speakerphone intercom call over a prescribed line, or to terminate this call, by momentary operations of a single nonlocking intercom key. In response to an initial depression of this key an intercom circuit, furnished in accordance with our invention, activates speakerphone equipment, forwards an intercom signal to the called party, and establishes the intercom connection. The release of the key removes the signal at the called station. When it is desired to terminate the intercom connection, the key is again depressed to turn the speakerphone off and to release the intercom connection. Accordingly, the objectionable redundant key operations are eliminated and replaced by a single key operation to perform the combined operations in a novel intercom circuit.

The control arrangement in accordance with our invention advantageously functions with an executive key telephone set equipped with a speakerphone and a secretary key telephone set to provide intercom connections therebetween. The intercom circuit in our control arrangement includes a bistable circuit consisting of three relays, contacts of which perform the priorly described functions. The three relays operate in a predetermined sequence in response to a first operation of the key which leaves the bistable circuit in a first state with two of the relays operated. Contacts of the two operated relays maintain the intercom call and prepare the circuit to respond to a subsequent key operation to terminate the call. With these two relays operated, a second operation of the key necessarily results in a different relay operation sequence which leaves the circuit in a second state with all relays released and the intercom call is terminated.

More particularly, a first one of the three relays is operated upon a first depression of the key. Contacts of the first relay operate an audible signal at the secretary key telephone set, operate a second one of the three relays which holds itself operated through its own contacts, in conjunction with a contact of the second relay energizes the speakerphone. When the nonlocking key is restored to normal following its first operation, the first relay is released causing the audible signal to be terminated and another contact of this relay maintains the energization of the speakerphone. Other contacts of the operated second relay and of the released first relay cause the third one of the relays to be operated. A contact of the operated third relay opens the path over which the contact of the first relay initially energized the speakerphone, and assures that it will not be energized over this path when the key is operated a second time to release the intercom call.

A second depression of the key only reoperates the first relay, contacts of which cause the speakerphone to be deenergized and the second relay to be released. When the key is restored to normal following its second operation, the reoperated first relay and the third relay are released.

Advantageously, the speakerphone energizing path includes a switchhook contact of the executive key telephone set. Thus, when the executive takes his handset off-hook either before or after an intercom call is established, the speakerphone is respectively not energized or is deenergized. In this manner the priorly described operations of the ON and OFF buttons on a speakerphone are eliminated.

On prior art executive key telephone sets, the intercom line key is locking and is mechanically interconnected with other telephone line pickup keys on the executive telephone. As a result, the operation of the intercom line key releases an operated telephone line pick-up key and thereby disconnects the telephone set from a telephone line and associated line circuit in a manner well known in the art. The pickup key must be reoperated after an intercom call is terminated in order to reconnect the telephone set to the telephone line to place other than an intercom call. Advantageously, the nonlocking intercom line key provided in accordance with our novel intercom circuit is not mechanically interconnected with the telephone line pickup keys. As a result, the operated telephone line key is not released when the intercom key is operated to place an intercom call and does not have to be reoperated after completion of the intercom call in order to place a subsequent call. Isolation of the telephone set from the telephone line is accomplished by transfer contacts of a relay responsive to operation of the key which transfers the connection of the telephone set from the operated telephone line pickup key to the intercom line.

BRIEF DESCRIPTION OF THE DRAWING

The above and other objects and features of our invention will be more apparent by reading the following description of an exemplary embodiment of our invention in conjunction with the drawing the single FIGURE of which is a schematic diagram of an executive's key telephone set equipped with a speakerphone, the novel intercom apparatus in accordance with this illustrative embodiment of our invention, and a secretary's key telephone set and other standard key telephone circuitry which functions with our novel apparatus.

DETAILED DESCRIPTION

Referring now to the drawing, there is shown an executive key telephone set 10 having, in accordance with our invention, a single nonlocking key designated SECTY for establishing intercom calls. Set 10 is associated with a speakerphone 11 which includes a speakerphone control unit 14, a voice amplifier 23 and a microphone-speaker assembly 24. The drawing also shows in detail circuitry of intercom circuit 12 which, in response to the operation of the SECTY key, provides the combined functions of connecting, disconnecting and signalling on intercom calls between set 10 and set 15, as well as relevant portions of an associated key telephone unit 13. Only those schematic elements of executive key telephone set 10, key telephone unit 13, speakerphone unit 11 and secretary key telephone set 15 are shown as are necessary for an understanding of the operation of intercom circuit 12. For additional details, reference may be made to U.S. Pat. No. 3,171,901 issued Mar. 2, 1965 to W. F. Clemency et al., and U.S. application Ser. No. 214,024 filed Dec. 30, 1971, by F. Duff et al. and assigned to the assignee hereof.

INITIATING INTERCOM AND SPEAKERPHONE OPERATION

An executive at key telephone set 10 desiring to talk via speakerphone 11 with the secretary at key telephone set 15 operates the nonlocking SECTY key on set 10. Intercom circuit 12 responds thereto and turns speakerphone 11 "on" (if handset 18 is on-hook), connects speakerphone 11 to telephone set 15, and operates buzzer B2 and lamp L2 at telephone 15 and lamp L1 at telephone 10. Considering these operations in greater detail, a first depression of the SECTY key on telephone set 10 connects ground 17 via contact SECTY-1 and lead W to the winding of relay S which is thereby operated. It should be noted that relay S, as well as relays DC and T to be discussed hereinafter, comprise our novel intercom circuit as briefly explained heretofore. Subsequent closure of the make contact of transfer contact S-4 causes relay DC to be operated over a path from ground 20 in speakerphone control unit 14, lead A1, and make contact S-4 to the winding of relay DC. Contacts of the now operated relays S and DC complete a path to operate relay K1 in control unit 14 when handset 18 of keyset 10 is left on-hook. Relay K1 is operated over a path from potential 21 in control unit 14, the winding of relay K1, lead S, make contact DC-2, break contact T-1, the make contact of transfer contact S-1, lead B, break contact OFF-1 of the nonlocking OFF key on speakerphone 11, lead LK, and the break contact of transfer contact LS-1 of keyset 18 hook switch LS to ground potential 22.

Contacts of the now-operated relays S, DC and K1 cause the aforementioned intercom and speakerphone circuit functions to be accomplished. In speakerphone 11 amplifier 23 is energized, thus enabling microphone and speaker assembly 24 to be utilized, over a path from amplifier 23, lead C, and through make contact K1-3 to potential 21. Amplifier 23 and assembly 24 are connected to handset 26 of secretary keyset 15 via leads ST and SR, the make contacts of transfer contacts DC-3 and DC-4, leads 34 and 35, and make contacts IC-1 and IC-2 of the intercom pick-up key at secretary keyset 15 to handset 26. Buzzer B2 at keyset 15 is operated over a path starting from ground 28 thereat and passing through buzzer B2, lead E, break contact A-1, lead 32, and make contact S-2 to potential 29. Lamp L2 at keyset 15 is lit over a path starting at ground potential 30 which passes through lamp L2, lead 31, and make contact DC-6, to potential 29. Lamp L1 under the SECTY key at keyset 10 is also operated over a path starting at ground potential 39 which passes through lamp L1, lead K, and make contact DC-6 to potential 29. As relay DC is operated for the duration of an intercom call, as described hereinafter, lamps L1 and L2 remains lit for the duration of the call to indicate the establishment of the intercom connection.

Release of the SECTY key at executive keyset 10, after its momentary operation to establish the intercom call, causes the opening of its make contact SECTY-1 which opens the operating path of relay S. Relay S is thereby released, but causes the operation of relay T. In addition, the release of relay S causes the operate path of relay K1 in control unit 14 to be interrupted at make contact S-1 and the operate path of relay DC to be interrupted at make contact S-4. These relays, however, are held operated over alternate paths as described hereinafter.

Relay T is operated over a path starting at ground potential 20 in control unit 14 which passes through make contact K1-2, lead AG, make contact DC-1, the now closed break contact S-4, the winding of relay T, and lead B to potential 19. The operation of relay T opens the priorly described operate path of relay K1 at break contact T-1 to prevent holding relay K1 operated when the intercom call is terminated as described in greater detail further in the specification. Upon the release of relay S the opening of its make contact S-1 interrupts the priorly described operate path of relay K1. Relay K1, however, is held operated over an alternate path through its make contact K1-1, the now closed break contact S-1, and the remainder of the operate path to ground potential 22 in keyset 10. The operate path of relay DC is interrupted by the opening of make contact S-4, but relay DC is held operated over an alternate path through its make contact DC-1, lead AG, and make contact K1-2 to ground potential 20.

Ground potential 20 on the alternate holding path of relay DC is also used to operate relay A in key telephone unit 13. Break contact A-1 of this relay interrupts the operate path of buzzer B2 at keyset 15, which prevents the buzzer from being reoperated when the SECTY key is susgsequently depressed to terminate the intercom call. The operate path of relay A includes the holding path of relay DC just described up to make contact DC-1 and then passes through lead F to keyset 10, break contact HOLD thereat, lead G, make contact DC-5, and lead 33 to the winding of relay A. Relay A is held operated for the duration of the intercom call, as it is under the control of relay DC which is also operated for the duration of the call.

In response to the operation of buzzer B2 and to the illumination of lamp L2 at secretary keyset 15, the secretary takes handset 26 off-hook and operates an intercom pickup key IC, make contacts IC-1 and IC-2 of which complete the talking path between speakerphone 11 and handset 26 described priorly.

SPEAKERPHONE TO HANDSET TRANSFER

If, at any time during an established intercom connection, it is desired to transfer from speakerphone 11 to handset 18, the executive need only take handset 18 off-hook. Automatically, relay K1 is released to disable speakerphone 11. Taking handset 18 off-hook operates switchhook contact LS–1 in keyset 10, and the break contact thereof interrupts the holding path of relay K1 to release this relay. The opening of make contact K1–3 removes potential 21 from lead C to deenergize amplifier 23. In addition, the opening of make contact K1–2 removes ground potential from lead AG, thus opening the priorly described holding path of relay DC in circuit 12 and relay A in key unit 13, but these relays are held operated over an alternate path. Ground potential 22 in executive keyset 10 holds relays DC and A operated over a path through the now closed make contact of transfer contact LS–1 to lead F of the holding path of relays A and DC. At this time speakerphone 11 is not functioning and handset 18 is connected via leads NT and NR to the priorly described talking path to handset 26.

In the event handset 18 is taken off-hook prior to the establishment of an intercom call, the opening of break contact LS–1 interrupts the priorly described operate path of relay K1 which will not be operated as a result. In turn, amplifier 23 is not energized and handset 18 is used for communicating with the secretary. In addition, relays A and DC now are operated over their priorly described holding path through make contact LS–1, rather than through make contact K1–2.

CALL TERMINATION

To terminate an intercom call between keyset 10 and keyset 15, the nonlocking SECTY key at set 15 is again momentarily operated. Its make contact SECTY–1 momentarily reapplies ground 17 to lead W. Relay S is thereby reoperated and the opening of its break contact S–1 interrupts the priorly described holding path of relay K1. Relay K1 is released and amplifier 23 is deenergized by the opening of make contact K1–3. The opening of make contact K1–2 opens the priorly described holding path for relays DC and A and these relays are released. The opening of make contact DC–6 deenergizes lamps L1 and L2, and the subsequent closure of break contacts DC–3, DC–4, and DC–5 reconnects handset 18 or speakerphone 11, and the HOLD key to pickup key contacts PU–1, PU–2, and PU–3, which are advantageously already closed due to pickup key PU not having been released when the SECTY key was operated. Thus, in a manner well known in the art, a call may immediately be placed over leads T and R without having to operate line pickup key PU.

The priorly described operate path of relay T is opened at break contact S–4, but relay T is held operated while the SECTY key is depressed and its contact SECTY–1 is closed, by the alternate path completed through diode D1 and make contact T–2. Upon release of the nonlocking SECTY key, ground 17 is removed from lead W and relay T is released.

What is claimed is:

1. A key telephone arrangement for operation with a first and second key telephone set comprising a nonlocking pickup key associated with said first set adapted to furnish all call functions relating to the extension of an intercom connection between said sets, means responsive during a first operation of said key for energizing a signal at said second set for the duration of said key depression, means responsive to said energizing means when said key is depressed for establishing said intercom connection between said sets, and means operative when said key is restored to its nonoperated state for transferring the control of said establishing means from said energizing means to a circuit responsive to a second operation of said key, and said circuit being responsive to said second operation of said key for releasing said establishing means to terminate said intercom connection.

2. The invention in accordance with claim 1 further comprising a speakerphone associated with said first set, means included in said energizing means for enabling said speakerphone upon the operation of said establishing means, and means for maintaining said speakerphone in its enabled state responsive to said first set remaining in an on-hook state, said maintaining means including means for disabling said speakerphone upon said second operation of said key.

3. The invention in accordance with claim 2 further comprising means responsive to said first set being changed to an off-hook state during said intercom connection for disabling said maintaining means.

4. A key telephone arrangement for providing an intercom connection between a first key telephone set equipped with a speakerphone and a second key telephone set comprising a nonlocking intercom key on said first set, a first operation of said key causing the establishment of said intercom connection and a second operation of said key causing the termination of said intercom connection, and a bistable relay circuit associated with said first set, said relay circuit normally being in a first state and changing to a second state responsive to a first operation of said key, and said relay circuit being returned to said first state responsive to a second operation of said key, said relay circuit comprising a first relay means being operated in response to and for the duration of a first operation of said key, said first relay means including first contact means for energizing said speakerphone upon said first set being on-hook at the time of said first operation of said key, and second contact means for energizing a signal at said second set indicating said intercom call.

5. The invention in accordance with claim 4 wherein said relay circuit further comprises second relay means operated in response to said first key operation, said second relay means including third contact means for establishing a talking path between said sets.

6. The invention in accordance with claim 5 wherein said relay circuit comprises third relay means operated in response to said second relay means being operated and said first relay means being released following said first operation of said key, said third relay means remaining operated until said key is released following said second operation of said key, and said third relay means including fourth contact means for preventing the energization of said signal upon said second operation of said key.

7. The invention in accordance with claim 6 wherein said second relay means further comprises fifth contact means for energizing a visual signal at said first and said second sets indicating the establishment of said intercom call.

8. The invention in accordance with claim 7 wherein said first relay means comprises sixth contact means for deenergizing said speakerphone upon said second operation of said key to terminate said intercom call.

9. The invention in accordance with claim 8 further comprising means at said first set responsive to said first set being taken off-hook prior to establishment of said intercom call for blocking said second contact means from energizing said speakerphone, and for deenergizing said speakerphone when said first set is taken off-hook during said intercom call.

10. A key telephone arrangement for connection to a first telephone set equipped with a nonlocking key and a speakerphone and to a second telephone set for providing an intercom connection between said sets, said arrangement comprising first relay means operated in response to a first depression of said key to cause establishment of said intercom connection and operated in response to a second depression of said key to cause termination of said intercom connection, said first relay means including first contact means for sending a signal to said second set indicating said intercom connection, second contact means causing said speakerphone to be energized responsive to said first telephone set being in an on-hook condition, and third contact means closed when said first relay means are released following said first depression of said key to maintain said speakerphone in its energized condition, second relay means operated by said second contact means and including fourth contact means for holding said second relay means operated after said first relay means are released following said first depression of said key, fifth contact means for establishing a talking path between said telephone sets, sixth contact means jointly responsive with said second contact means to complete an energizing path for said speakerphone, and seventh contact means causing said first contact means to be locked out so that said signal is not sent to said second set in response to said second depression of said key, and third relay means operated jointly responsive to said first relay means being released and said second relay means being operated during said second depression of said key and including eighth contact means for opening said speakerphone energizing path to block energization of said speakerphone by said second contact means upon said second depression of said key, and ninth contact means causing said third relay means to be released upon the release of said key following said second depression thereof.

* * * * *